United States Patent [19]

Garwood et al.

[11] Patent Number: 5,065,372
[45] Date of Patent: Nov. 12, 1991

[54] SONAR TRANSDUCER WITH EXPLOSIVE SHOCK PROTECTOR

[75] Inventors: Joe Garwood, Holliston; Thomas Baldasarre, Bridgewater; Mario Delara, Boston; John Pagliarini, Jr., Ocean Bluff; Alfred Poturnicki, Jr., Duxbury; James Traft, Milton, all of Mass.

[73] Assignee: General Instrument Corp., Pa.

[21] Appl. No.: 565,979

[22] Filed: Aug. 13, 1990

[51] Int. Cl.⁵ .............................................. H04R 1/02
[52] U.S. Cl. .................................... 367/152; 367/191
[58] Field of Search ............... 367/141, 147, 152, 167, 367/172, 135, 191

[56] References Cited

U.S. PATENT DOCUMENTS 3,790,927  2/1974  Chwastyk ........................... 367/133
3,968,472  7/1976  Taylor ................................. 367/135

Primary Examiner—Brian S. Steinberger
Attorney, Agent, or Firm—James & Franklin

[57] ABSTRACT

The sonar transducer is protected from explosion shock by a variable impedance device, such as a metal oxide varistor, connected in parallel with the energy conversion component. The varistor normally has a very high electrical impedance, but becomes conductive upon application of the very high voltage output of the energy conversion component as a result of a rapid increase in mechanical energy, such as would accompany an underwater explosion in the vicinity of the transducer, to limit both voltage and current to a safe level so that the transducer can thereafter operate within acceptable parameters.

2 Claims, 1 Drawing Sheet

SONAR TRANSDUCER WITH EXPLOSIVE SHOCK PROTECTOR

The present invention relates to sonar transducers and in particular to a sonar transducer which is protected from explosive shock such that it has the capability of surviving an underwater explosion in the vicinity of the transducer.

A sonar transducer is a device designed to be immersed in water and to there function as a means for converting energy from one form to another. The transducer either detects pressure variations in water and converts them to electrical signals or converts electrical signals to pressure waves in the water. The device includes an energy conversion component to which electrical connections are made. The conversion component and electrical connections are encased within an acoustically transparent water proof housing resistant to corrosion.

The energy conversion component may include either nickel or certain ceramic substances. One general type of conventional transducer includes a pair of coaxial piezoelectric ceramic cylinders with end caps, which, when assembled form an enclosure which has partially coated inner and outer metal surfaces. The coated inner and outer surfaces are respectively connected to leads which are attached to terminals on the internal portion of a plug which extends through one of the end caps. The terminals are, in turn, connected to a cable which extends from the enclosure. One such device is described in detail in U.S. Pat. No. 4,782,470 issued Nov. 1, 1988 to Alfred S. Poturnicki Jr., and James E. Traft and is entitled "Hydrophone with Extended Operational Life".

Many sonar transducers are specifically designed for military applications. The requirements for such military applications often include the capability of surviving an underwater explosion in the vicinity of the transducer and operating normally after the explosion. Since, by definition, a transducer includes a device which converts mechanical energy to electrical energy and visa versa, the conversion device generates a large pulse or transient of electrical energy when it is subjected to the massive mechanical disturbance which accompanies a nearby underwater explosion.

In a typical sonar transducer, the pulse generated as a result of such a mechanical disturbance may reach a peak voltage of approximately fifty thousand volts, a peak power of one megawatt and may have an energy content of one kilojoule. The duration of such a pulse is typically one millisecond.

If the transducer does not include a device designed to protect it from such an electrical surge, in the event of an explosion, severe damage may occur due to insulation breakdown which leads to excessive current and overheating of the ceramic parts until they crack open. Thus, even if the transducer physically survives the explosion, the electrical overload normally prevents the transducer from thereafter operating normally.

In the past, in order to protect the energy converting component from the shock of explosion, spark gaps or other similar devices were incorporated into the transducer. These spark gap devices are usually connected in parallel with the conversion component. However, tests reveal that the spark gap contacts tend to fuse together, thereby placing a permanent short circuit across the conversion component and rendering it inoperative. Accordingly, the use of spark gap devices does not solve the problem. Even if the device physically survives an explosion, it cannot thereafter operate within the prescribed parameters and hence is useless.

In general, the present invention overcomes the disadvantages associated with the prior art protective structures by utilizing a variable impedance device instead of a spark gap. The variable impedance device is a non-linear device in which the electrical impedance varies as a function of the applied voltage. At low applied voltage, the device has a very high impedance and hence does not draw much current. It acts as an open circuit. As the voltage rapidly increases, however, the impedance decreases by many orders of magnitude and at a very high applied voltage, the impedance is very low, the device is conductive and can draw a very large current from the voltage source. When placed in parallel with the energy conversion component, the variable impedance device has virtually no effect on the operation of the transducer under normal conditions. With a low applied voltage, the impedance is sufficiently high that very little current passes through the device. However, when a massive mechanical disturbance occurrences, such as that resulting from an underwater explosion, the conversion component will generate a very high voltage which results in a substantial decrease in the impedance of the variable impedance device, such that a large current passes through the device, instead of through the other components of the transducer. Hence, the other components of the transducer are protected. After the mechanical disturbance ceases, the electrical impedance of the variable impedance device returns to its normal, very high level and the transducer can then again operate within its normal parameters. Thus, the potentially destructive energy of the incoming transient pulse is shunted through the variable impedance device to protect vulnerable components of the transducer.

One variable electrical impedance device which has proven particularly effective in this regard is known as a metal oxide varistor. Such devices are commercially available from Harris, General Electric and other sources. They are commonly used as surge arrestors for protecting public utility power lines from electrical surges resulting from lightning strikes and other power lines spikes. In that environment, the varistor is used to conduct the surge to ground before it is transmitted along the power line. Hence the varistor is connected between the power line and ground. Up until now, such devices have not been employed to protect sonar transducers from explosive shock and have not been used as a shunt to protect circuits from electrical surges generated by internal energy conversion devices.

It is, therefore, a prime object of the present invention to provide a sonar transducer with a explosive shock protector which has the capability of operating within normal parameters after a massive mechanical disturbance such as would result from an explosion or other major shocks.

It is another object of the present invention to provide a sonar transducer with shock protector which utilizes a variable electrical impedance device connected in parallel with the energy conversion component of the transducer.

It is another object of the present invention to provide a sonar transducer with an explosive shock protector wherein the variable electrical impedance device takes the form of a metal oxide varistor.

It is another object of the present invention to provide a sonar transducer with an explosive shock protector where the protector is a commercially available device which can be incorporated within the transducer without altering the size or substantially increasing the cost thereof.

It is another object of the present invention to provide a sonar transducer with an explosive shock protector capable of meeting military specifications.

In accordance with the present invention, a sonar transducer comprising means for converting mechanical energy into electrical energy is provided including a means for protecting the transducer from the high electrical energy output of the converting means resulting from a rapid increase in mechanical energy of the type accompanying an underwater explosion. The protecting means comprises variable electrical impedance means operably electrically connected in parallel with the converting means. The variable electrical impedance means normally has a very high electrical resistance, but becomes highly conductive upon application of the very high electrical energy output of the converting means as a result of a rapid increase in mechanical energy.

The variable electrical impedance means preferably comprises varistor means. The varistor means preferably comprises a metal oxide varistor.

To these and such other objects which may hereinafter appear, the present invention relates to a sonar transducer with a explosive shock protector as described in detailed in the following specification and recited in the annexed claims, taken together with the accompanying drawings wherein like numerals refer to like parts and in which:

Figure 1:
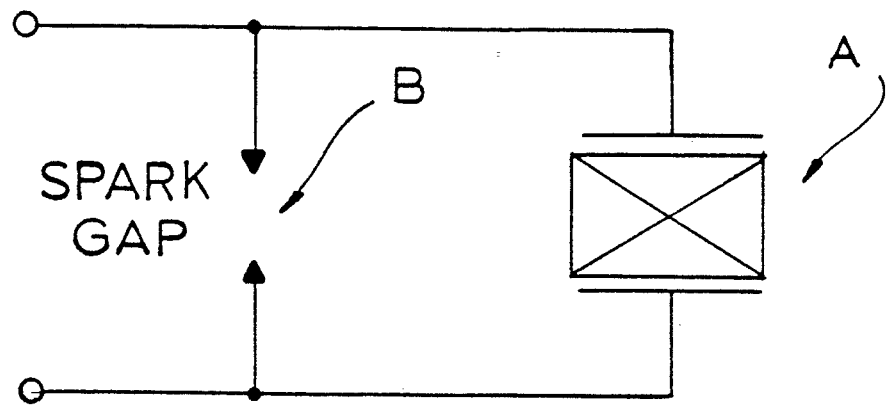
FIG. 1 is a schematic diagram of a sonar transducer with a spark gap type explosive shock protector as disclosed in the prior art.

As seen in FIG. 1, the prior art sonar transducer includes an energy conversion component, generally designated A, which may consist of a piezoelectric material in the form of a ceramic cylinder, ring or the like. Situated in electrical parallel with component A is a spark gap component, generally designated B. Component B is normally an open circuit and therefore does not pass any current or affect the operation of the transducer. However, under extreme conditions, such as an underwater explosion in proximity to the transducer, component A would generate a transient of high electrical potential, which will cause a spark to jump the gap in component B. This often causes the gap to fuse, thereby creating a permanent short circuit across component A. Hence, the use of a spark gap in this situation is often self-defeating, because while it may protect the transducer from the transient generated by component A, the transducer thereafter cannot operate in a normal operating range because of the short created by the fused gap.

Figure 2:
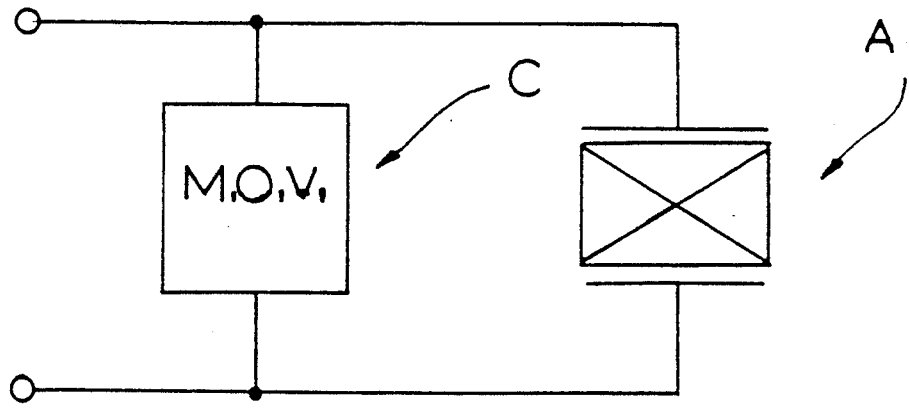
FIG. 2 is a schematic diagram of a sonar transducer of the present invention including an explosive shock protector in the form of a variable electrical impedance device.

FIG. 2 shows our invention. The spark gap B of FIG. 1 has been replaced with a variable electrical impedance device, generally designated C, which has the characteristic of a normally high impedance, but becomes highly conductive upon application of a very high electrical potential output across its terminals. Device C is preferably a non-linear device whose impedance is a function of the potential difference applied across its terminals, which can react quickly to limit the voltage and current to safe levels.

Device C is preferably a metal-oxide-varistor of the type which is commercially available, such as Harris BB series model Nos. V112BB60 or V142BB60. Such a varistor is composed primarily of zinc oxide with small additions of other metal oxides.

The size of the varistor is chosen in accordance with the electrical properties of the transducer. A varistor of appropriate size will absorb practically all of the energy and limit the voltage to a safe value during an electrical surge. Before and after the surge, the impedance of the varistor will be high in comparison with all other circuit components and therefore the varistor will have a negligible effect on normal transducer operation. The varistor can absorb a number of explosive shock electrical surges before its properties change significantly. Accordingly, the use of a varistor in the manner described will substantially extend the expected useful life of a transducer in an environment where underwater explosions occur.

The varistor behaves similar to back-to-back zener diodes. Its sharp breakdown characteristics enable it to provide transient suppression performance. It reacts quickly to the potential increase and does not permit unsafe levels of current or excessive voltage, as spark gaps often do.

While only a single preferred embodiment of the present invention has been disclosed herein for purposes of illustration, it is obvious that many variations and modifications could be made thereto. It is intended to cover all of these variations and modifications which fall within the scope of the present invention, as defined by the following claims.

We claim:

1. A sonar transducer comprising energy converting means and means for protecting the transducer from the high electrical energy output of said energy converting means resulting from a rapid increase in mechanical energy of the type accompanying an underwater explosion, said means for protecting the transducer comprising variable electrical impedance means operably electrically connected in parallel with said converting means, said variable impedance means normally having a very high electrical impedance but effective to become conductive upon application of a very high electrical energy output of said converting means, and wherein said variable electrical impedance means comprises varistor means.

2. The transducer of claim 1 wherein said varistor means comprises a metal oxide varistor.

* * * * *